(12) United States Patent
Ke et al.

(10) Patent No.: US 8,743,794 B2
(45) Date of Patent: Jun. 3, 2014

(54) METHOD OF FLOW CONTROL BETWEEN RADIO NETWORK CONTROLLER AND BASE STATION

(75) Inventors: Yazhu Ke, Shenzhen (CN); Xiang Cheng, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 851 days.

(21) Appl. No.: 12/525,846

(22) PCT Filed: Dec. 24, 2007

(86) PCT No.: PCT/CN2007/003750
§ 371 (c)(1),
(2), (4) Date: Aug. 5, 2009

(87) PCT Pub. No.: WO2008/095377
PCT Pub. Date: Aug. 14, 2008

(65) Prior Publication Data
US 2010/0002645 A1    Jan. 7, 2010

(30) Foreign Application Priority Data
Feb. 5, 2007   (CN) .......................... 2007 1 0003509

(51) Int. Cl.
*H04W 4/00*     (2009.01)
*H04W 72/04*    (2009.01)

(52) U.S. Cl.
CPC ..................... *H04W 72/04* (2013.01)
USPC ....................................................... 370/329

(58) Field of Classification Search
CPC .................................................... H04W 72/04
USPC ....................................................... 370/329
See application file for complete search history.

(56) References Cited

U.S. PATENT DOCUMENTS

| 2005/0207343 A1 | 9/2005 | Han |
| 2006/0050723 A1* | 3/2006 | Yu ................................. 370/412 |
| 2006/0203760 A1* | 9/2006 | Fukui et al. ................... 370/328 |

(Continued)

FOREIGN PATENT DOCUMENTS

| CN | 1859152 A | 7/2005 |
| CN | 100426737 C | 7/2005 |

(Continued)

OTHER PUBLICATIONS

Universal Mobile Telecommunications System (UMTS); UTRAN Iub interface user plane protocols for Common Transport Channel data streams (3GPP TS 25.435 version 7.3.0 Release 7), ETSI, 2006.

*Primary Examiner* — Shaq Taha
(74) *Attorney, Agent, or Firm* — Jones Walker, LLP

(57) ABSTRACT

A method of flow control between radio network controller and base station is disclosed. The method includes: step 1, the base station carrying information of Maximum PDU Length in a capacity allocation frame of High Speed Downlink Shared Channel; step 2, the radio network controller receiving the capacity allocation frame from the base station; step 3, the radio network controller transmitting data to the base station, wherein the amount of data transmitted during one HS-DSCH Interval is less than or equal to the product of Maximum PDU Length carried in said capacity allocation frame and the maximum number of PDUs that can be transmitted during one HS-DSCH Interval. The disclosed method enables the base station control the flow with the radio network controller in the common state of the fortified connection mode.

12 Claims, 1 Drawing Sheet

| 7 | | 0 |
|---|---|---|
| Spare bit 7-6 | Congestion Status | CmCH-PI |
| Maximum Mac-flow PDU Length ||| 
| Maximum Mac-flow PDU Length (continue) || HS-DSCH Credits |
| HS-DSCH Credits (continue) |||
| HS-DSCH Interval |||
| HS-DSCH Repetition Period |||
| Spare Extension |||

(56) References Cited

U.S. PATENT DOCUMENTS

2008/0089285 A1* 4/2008 Pirskanen et al. ............ 370/329
2008/0188220 A1* 8/2008 DiGirolamo et al. ......... 455/434
2009/0005053 A1* 1/2009 Agin et al. .................... 455/450
2009/0221292 A1* 9/2009 Lundh et al. .................. 455/445
2010/0014467 A1* 1/2010 Wang et al. ................... 370/329

FOREIGN PATENT DOCUMENTS

| CN | 1885965 A | 7/2006 |
|----|-----------|--------|
| CN | 100459743 C | 7/2006 |
| EP | 1626539 A1 | 2/2006 |
| WO | 2006/103136 A1 | 10/2006 |

* cited by examiner

METHOD OF FLOW CONTROL BETWEEN RADIO NETWORK CONTROLLER AND BASE STATION

TECHNICAL FIELD

The present invention relates to mobile communication systems, and more particularly, relates to a method of flow control between radio network controller and base station.

BACKGROUND OF THE INVENTION

In order to increase user high data flow and system throughput, 3GPP R5 standard protocol introduces a High Speed Downlink Shared Channel (HS-DSCH), the physical channel mapped by the channel applies time division and code division, and the channel applies the technology of Hybrid Automatic Repeat reQuest (HARQ) and Adaptive Modulation and Coding (AMC) to make the peak rate reach to 10.8 Mbps~30 Mbps. Its ultimate target is to increase the system capacity and reduce transmission delay so as to meet the subscribers' requirement for Quality of Service (QoS) by providing access to the High Speed Packet Service.

3GPP protocol standard strengthens Forward Access State (CELL_FACH) in connection mode of Radio Resource Control (RRC), and/or Paging State (CELL_PCH/URA_PCH) in connection mode of Radio Resource Control (RRC), that is, High Speed Downlink Packet Access (HSDPA) technology can also be used in CELL_FACH and/or CELL_PCH/URA_PCH, and herein using the High Speed Shared Packet Access (HSDPA) technology in the state of CELL_FACH and/or CELL_PCH/URA_PCH is called as enhanced common state of fortified connection mode for short. When user equipment is in the enhanced common state of fortified connection mode, data in logical channels including Common Control Logical CHannel (CCCH), Dedicated Control Logical CHannel (DCCH), Dedicated Traffic Logical CHannel (DTCH), Multimedia Control Logical CHannel (MCCH), Multimedia Traffic Logical CHannel (MTCH) and so on can be mapped to the High Speed Downlink Shared Channel to be transmitted.

However, since the base station implements data scheduling, in order to avoid data overflow during the radio network controller transmitting data to the base station, flow control should be performed between base station and radio network controller, that is, the radio network controller could apply the base station for the cache amount of data to be transmitted, while the base station could allocate data capacity to the radio network controller. At present, the capacity allocated to the radio network controller by the base station in 3GPP standard is indicated by Maximum MAC-d PDU Length (maximum length of Protocol Data Unit of Media Access Control entity) and HS-DSCH Credits (the number of PDUs with Maximum Mac-d PDU Length that could be transmitted during one time interval of High Speed Downlink Shared Channel (HS-DSCH Interval)).

For the use of High Speed Downlink Shared Channel in enhanced common state of fortified connection mode, there is no specification on how to implement flow control between the radio network controller and the base station in prior art, thus the user equipment in enhanced common state of fortified connection mode cannot receive data accurately; therefore, there is a need for re-indicating the capacity allocated to the radio network controller by the base station, so as to ensure that the radio network controller and base station can also implement flow control regarding the user equipment in enhanced common state of fortified connection mode.

SUMMARY OF THE INVENTION

The technical problem to be solved in the present invention is to provide a method of flow control between radio network controller and base station to enable the radio network controller and base station also implement flow control, and thereby to ensure that the user equipment can receive data accurately, regarding the user equipment in enhanced common state of fortified connection mode.

In order to solve the above technical problem, the present invention provides a method of the base station transmitting the data capacity allocated by the base station, comprising:

the base station carrying information of Maximum Protocol Data Unit (PDU) Length in a capacity allocation frame of High Speed Downlink Shared Channel.

Further, said Maximum PDU Length is any one of the following: Maximum MAC-c/sh/m (Media Access Control-common/share/MBMS (Multimedia Broadcast Multicast Service)) PDU Length, Maximum MAC-d (Media Access Control-dedicated) PDU Length and Maximum MAC-hs (Media Access Control-high speed) PDU Length.

Further, said method specifically comprising: the base station allocating a capacity of High Speed Downlink Shared Channel to the radio network controller, carrying information of the Maximum PDU Length in the capacity allocation frame of High Speed Downlink Shared Channel, and transmitting said capacity allocation frame to the radio network controller.

Further, said Maximum PDU Length is a Maximum PDU Length that could be transmitted during one HS-DSCH Interval.

Further, said Maximum PDU Length corresponds to the priority of common transmission channel carried in said capacity allocation frame.

Further, said Maximum PDU Length occupies 13 bits in said capacity allocation frame.

The present invention also provides a method of the radio network controller transmitting data according to the allocated data capacity, comprising:

the radio network controller receiving a capacity allocation frame from a base station;

the radio network controller transmitting data to the base station, wherein the amount of data transmitted during one HS-DSCH Interval is less than or equal to the product of the Maximum PDU Length carried in said capacity allocation frame and the maximum number of PDUs can be transmitted during one HS-DSCH Interval.

Further said Maximum PDU Length is any one of the following: Maximum MAC-c/sh/m PDU Length, Maximum MAC-d PDU Length and Maximum MAC-hs PDU Length.

Further, said Maximum PDU Length is a Maximum PDU Length that can be transmitted during one HS-DSCH Interval.

Further, said Maximum PDU Length corresponds to the priority of common transmission channel carried in said capacity allocation frame.

Further, said Maximum PDU Length occupies 13 bits in said capacity allocation frame.

Further, the radio network controller transmits data to the base station according to the information of capacity allocation carried in the capacity allocation frame; said information of capacity allocation comprises the number of time intervals that the cache size of High Speed Downlink Shared Channel can be transmitted continuously, the Maximum PDU Length can be transmitted during one HS-DSCH Interval, the maximum number of PDUs can be transmitted during one HS-DSCH Interval, and the time interval that the cache size of High Speed Downlink Shared Channel can be transmitted.

The present invention also provides a method of flow control between radio network controller and base station, comprising:

Step 1, the base station carrying information of Maximum PDU Length in a capacity allocation frame of High Speed Downlink Shared Channel;

Step 2, the radio network controller receiving the capacity allocation frame from the base station;

Step 3, the radio network controller transmitting data to the base station, wherein the amount of data transmitted during one HS-DSCH Interval is less than or equal to the product of the Maximum PDU Length carried in said capacity allocation frame and the maximum number of PDUs can be transmitted during one HS-DSCH Interval.

Further, said Maximum PDU Length is any one of the following: Maximum MAC-c/sh/m PDU Length, Maximum MAC-d PDU Length and Maximum MAC-hs PDU Length.

Further, said step 1 specifically comprising: the base station allocating a capacity of High Speed Downlink Shared Channel to the radio network controller, carrying information of the Maximum PDU Length in said capacity allocation frame, and transmitting said capacity allocation frame to the radio network controller.

Further, before said step 1, there exists:

the radio network controller transmitting a capacity request frame of High Speed Downlink Shared Channel, in which the cache size of the data to be transmitted is carried, to the base station.

Further, said Maximum PDU Length is a Maximum PDU Length that can be transmitted during one HS-DSCH Interval.

Further, said Maximum PDU Length corresponds to the priority of common transmission channel carried in said capacity allocation frame.

Further, said Maximum PDU Length occupies 13 bits in said capacity allocation frame.

Further, in said step 3, the radio network controller transmits data to the base station according to the information of capacity allocation carried in the capacity allocation frame; said information of capacity allocation comprises the number of time intervals that the cache size of High Speed Downlink Shared Channel can be transmitted continuously, the Maximum PDU Length can be transmitted during one HS-DSCH Interval, the maximum number of PDUs can be transmitted during one HS-DSCH Interval, and the time interval that the cache size of High Speed Downlink Shared Channel can be transmitted.

After applying the method of the present invention, the base station can transmit the data capacity allocated by the base station to the radio network controller in enhanced common state of fortified connection mode, therefore, the radio network controller can transmit data to the base station by using a traffic data unit with any kind of length, ensuring the user equipment receives the data accurately and improving resource utilization of the system.

PREFERRED EMBODIMENTS OF THE PRESENT INVENTION

The technical scheme of the present invention will be described in further detail in combination with the drawings and embodiments.

The core idea of the present invention is: carrying information of the Maximum PDU Length in a capacity allocation frame of High Speed Downlink Shared Channel, wherein said maximum PDU Length might be Maximum MAC-d PDU Length, said Maximum PDU Length might also be Maximum MAC-c/sh/m PDU Length or Maximum MAC-hs PDU Length, so as to implement the flow control between radio network controller and base station in enhanced common state of fortified connection mode.

Figure 1:
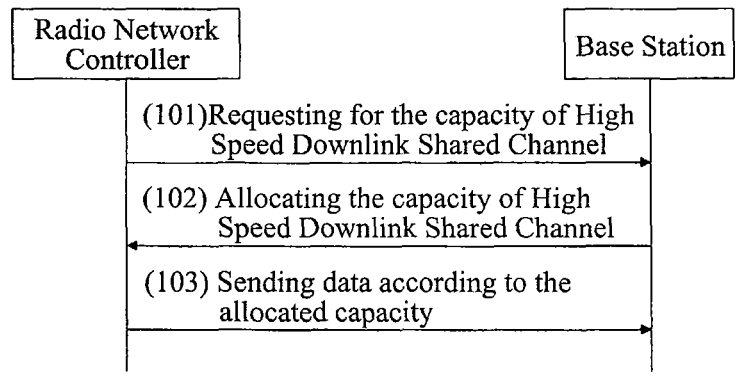
FIG. 1 is a schematic view of a flow chart of the specific implementation of a method of flow control between radio network controller and base station in accordance with the present invention.

The present invention provides a method of flow control between radio network controller and base station, and as shown in FIG. 1, the method comprises the following steps:

101, Requesting for a capacity of High Speed Downlink Shared Channel: the radio network controller transmitting a capacity request frame of High Speed Downlink Shared Channel, in which the cache size of the data to be transmitted is carried, to the base station;

102, Allocating the capacity of High Speed Downlink Shared Channel: the base station allocating data capacity—that is, allocating the capacity of High Speed Downlink Shared Channel, to the radio network controller, carrying information of capacity allocation including Maximum PDU Length and so on in a capacity allocation frame of High Speed Downlink Shared Channel to indicate the allocated capacity, and returning the capacity allocation frame of High Speed Downlink Shared Channel to the radio network controller;

Said Maximum PDU Length is a Maximum PDU Length can be transmitted during one HS-DSCH Interval.

Said Maximum PDU Length is any one of the following: Maximum PDU MAC-c/sh/m Length, Maximum MAC-d PDU Length and Maximum MAC-hs PDU Length.

Said Maximum PDU Length corresponds to the priority of common transmission channel carried in said capacity allocation frame.

Said Maximum PDU Length can but not limited to occupy 13 bits in said capacity allocation frame.

Besides the Maximum PDU Length, said information of capacity allocation also comprises: the maximum number of PDUs can be transmitted during one HS-DSCH Interval, the number of time intervals that the cache size of High Speed Downlink Shared Channel can be transmitted continuously, and the time interval that the cache size of High Speed Downlink Shared Channel can be transmitted.

This step is also a method of the base station transmitting the data capacity allocated by the base station, which is provided by the present invention.

103, Transmitting data according to the allocated capacity: the radio network controller receiving said capacity allocation frame, determining the data capacity allocated by the base station, that is, determining the capacity of High Speed Downlink Shared Channel allocated by the base station, according to the information of capacity allocation carried in the capacity allocation frame, and transmitting the data, of which the amount is less than or equal to the allocated capacity, to the base station, that is, the amount of the data transmitted to the base station during one HS-DSCH Interval is less than or equal to the product of said Maximum PDU Length and the maximum number of PDUs can be transmitted during one HS-DSCH Interval.

This step is also a method of the radio network controller transmitting data according to the allocated data capacity provided by the present invention.

Figure 2:
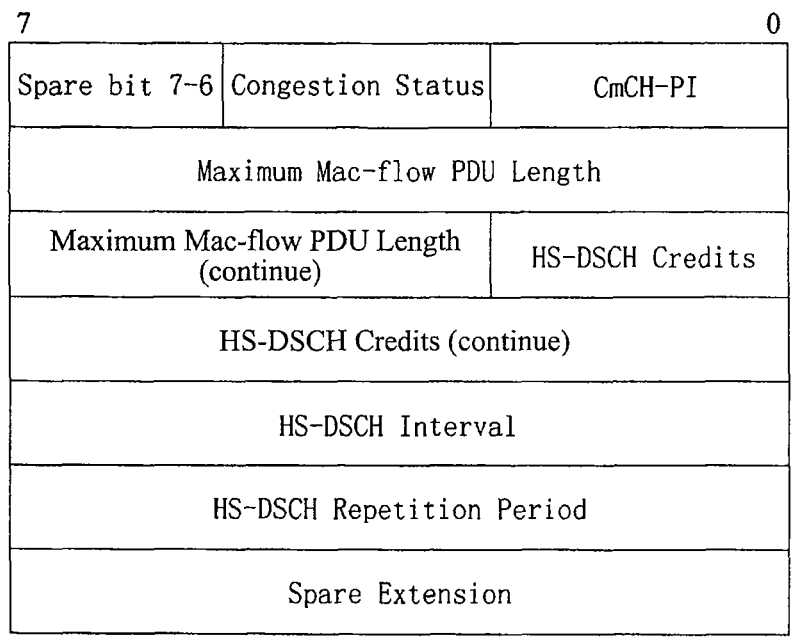
FIG. 2 is a schematic view of the structure of the capacity allocation frame of High Speed Downlink Shared Channel in enhanced common state of fortified connection mode in accordance with the present invention.

FIG. 2 is a schematic view of the structure of a capacity allocation frame of High Speed Downlink Shared Channel in enhanced common state of fortified connection mode in accordance with the present invention; wherein:

Spare bit 7-6 is used for indicating the $6^{th}$ and $7^{th}$ bits are spared bits;

Congestion Status is used for the base station to indicate whether the network resource of the transmission layer is congested;

CmCH-PI is an indication of the priority of common transmission channel;

Maximum Mac-flow PDU Length is the Maximum PDU Length that can be transmitted during one HS-DSCH Interval;

HS-DSCH Credits is the number of PDUs with Maximum Mac-flow PDU Length can be transmitted during one HS-DSCH Interval.

HS-DSCH Interval is the time interval that the cache size of High Speed Downlink Shared Channel in the capacity allocation frame can be transmitted;

HS-DSCH Repetition Period is the number of time intervals that the cache size of High Speed Downlink Shared Channel in the capacity allocation frame can be transmitted continuously;

Spare Extension is the bits that can be extended in the future.

Of course that the present invention can also have various other embodiments, and without departing from the spirit and essence of the present invention, those skilled in the art can make all kinds of corresponding modifications and variations according to the present invention, and all of these corresponding modifications and variations fall into the scope of the claims of the present invention.

INDUSTRIAL APPLICATION

After applying the methods of the present invention, the base station can transmit the data capacity allocated by itself to the radio network controller in common state of fortified connection mode, therefore, the radio network controller can use a traffic data unit with any kind of length to transmit the data to the base station, ensuring the user equipment receives the data accurately and improving resource utilization of the system.

What we claim is:

1. A method of a radio network controller transmitting data according to an allocated data capacity, comprising:
    the radio network controller receiving a capacity allocation frame regarding a user equipment using the High Speed Shared Packet Access (HSDPA) technology in the state of CELL_FACH and/or CELL_PCH/URA_PCH from a base station; and
    the radio network controller transmitting data to the base station, wherein the amount of data transmitted during one High Speed Downlink Shared Channel Interval is less than or equal to a product of Maximum Protocol Data Unit Length carried in said capacity allocation frame and maximum number of Protocol Data Units can be transmitted during one High Speed Downlink Shared Channel Interval;
    wherein the radio network controller transmits data to the base station according to information of capacity allocation carried in said capacity allocation frame; said information of capacity allocation comprises number of time intervals that a cache size of High Speed Downlink Shared Channel can be transmitted continuously, the Maximum Protocol Data Unit Length can be transmitted during one High Speed Downlink Shared Channel Interval, maximum number of Protocol Data Units can be transmitted during one High Speed Downlink Shared Channel Interval, and time interval that the cache size of High Speed Downlink Shared Channel can be transmitted.

2. The method of claim 1, wherein said Maximum Protocol Data Unit Length is any one of the following: Maximum Media Access Control-common/share/Multimedia Broadcast Multicast Service Protocol Data Unit Length, Maximum Media Access Control-dedicated Protocol Data Unit Length and Maximum Media Access Control-high speed Protocol Data Unit Length.

3. The method of claim 1, wherein said Maximum Protocol Data Unit Length is a Maximum Protocol Data Unit Length that can be transmitted during one High Speed Downlink Shared Channel Interval.

4. The method of claim 1, wherein said Maximum Protocol Data Unit Length corresponds to a priority of common transmission channel carried in said capacity allocation frame.

5. The method of claim 1, wherein said Maximum Protocol Data Unit Length occupies 13 bits in said capacity allocation frame.

6. A method of flow control between radio network controller and base station, comprising:
    Step 1, regarding a user equipment using the High Speed Shared Packet Access (HSDPA) technology in the state of CELL_FACH and/or CELL_PCH/URA_PCH, the base station carrying information of Maximum Protocol Data Unit Length in a capacity allocation frame of High Speed Downlink Shared Channel;
    Step 2, the radio network controller receiving the capacity allocation frame from the base station;
    Step 3, the radio network controller sending data to the base station, wherein the amount of data transmitted during one High Speed Downlink Shared Channel Interval is less than or equal to a product of the Maximum Protocol Data Unit Length carried in said capacity allocation frame and maximum number of Protocol Data Units can be transmitted during one High Speed Downlink Shared Channel Interval;
    wherein in said step 3, the radio network controller transmits data to the base station according to information of capacity allocation carried in said capacity allocation frame; said information of capacity allocation comprises number of time intervals that a cache size of High Speed Downlink Shared Channel can be transmitted continuously, the Maximum Protocol Data Unit Length can be transmitted during one High Speed Downlink Shared Channel Interval, maximum number of Protocol Data Units can be transmitted during one High Speed Downlink Shared Channel Interval, and time interval that the cache size of High Speed Downlink Shared Channel can be transmitted.

7. The method of claim 6, wherein said Maximum Protocol Data Unit Length is any one of the following: Maximum Media Access Control-common/share/Multimedia Broadcast Multicast Service Protocol Data Unit Length, Maximum Media Access Control-dedicated Protocol Data Unit Length and Maximum Media Access Control-high speed Protocol Data Unit Length.

8. The method of claim 6, wherein said step 1 specifically comprising: the base station allocating a capacity of High Speed Downlink Shared Channel to the radio network controller, carrying the information of the Maximum Protocol Data Unit Length in said capacity allocation frame, and sending said capacity allocation frame to the radio network controller.

9. The method of claim 6, before said step 1, further comprising:
- the radio network controller sending a capacity request frame of High Speed Downlink Shared Channel, in which a cache size of data to be transmitted is carried, to the base station.

10. The method of claim 6, wherein said Maximum Protocol Data Unit Length is a Maximum Protocol Data Unit Length that can be transmitted during one High Speed Downlink Shared Channel Interval.

11. The method of claim 6, wherein said Maximum Protocol Data Unit Length corresponds to a priority of common transmission channel carried in said capacity allocation frame.

12. The method of claim 6, wherein said Maximum Protocol Data Unit Length occupies 13 bits in said capacity allocation frame.

* * * * *